US010611892B2

(12) United States Patent
Gross et al.

(10) Patent No.: US 10,611,892 B2
(45) Date of Patent: Apr. 7, 2020

(54) CARBON FIBER RECOVERY COMPOSITIONS AND METHODS

(71) Applicant: The Boeing Company, Chicago, IL (US)

(72) Inventors: Adam F. Gross, Santa Monica, CA (US); John J. Vajo, West Hills, CA (US); Ashley M. Nelson, Los Angeles, CA (US); April R. Rodriguez, Los Angeles, CA (US); Hardik Dalal, Seattle, WA (US); Panagiotis E. George, Lake Tapps, WA (US)

(73) Assignee: The Boeing Company, Chicago, IL (US)

( * ) Notice: Subject to any disclaimer, the term of this patent is extended or adjusted under 35 U.S.C. 154(b) by 329 days.

(21) Appl. No.: 15/482,012

(22) Filed: Apr. 7, 2017

(65) Prior Publication Data

US 2018/0291174 A1    Oct. 11, 2018

(51) Int. Cl.
| | | |
|---|---|---|
| *C08J 11/28* | (2006.01) | |
| *D01F 9/12* | (2006.01) | |
| *B09B 3/00* | (2006.01) | |
| *B09B 5/00* | (2006.01) | |

(52) U.S. Cl.
CPC .............. *C08J 11/28* (2013.01); *B09B 3/0083* (2013.01); *B09B 5/00* (2013.01); *D01F 9/12* (2013.01); *Y02W 30/622* (2015.05); *Y02W 30/706* (2015.05)

(58) Field of Classification Search
CPC .......... B09B 3/0083; B09B 5/00; C08J 11/28; D01F 9/12; Y02W 30/622; Y02W 30/706
See application file for complete search history.

(56) References Cited

U.S. PATENT DOCUMENTS

| | | | |
|---|---|---|---|
| 2007/0142218 A1* | 6/2007 | Harris | .................... B01J 27/125 502/53 |
| 2014/0005415 A1* | 1/2014 | Sun | ......................... C01B 33/40 549/230 |
| 2014/0046076 A1 | 2/2014 | Marchand et al. | |
| 2017/0157801 A1 | 6/2017 | Yang et al. | |
| 2018/0030554 A1* | 2/2018 | Teixeira | ................... C13K 1/04 |

FOREIGN PATENT DOCUMENTS

| | | |
|---|---|---|
| CN | 105837470 | 8/2016 |
| CN | 106543084 | 3/2017 |
| EP | 3301128 | 4/2018 |

OTHER PUBLICATIONS

Kamimura et al., "Depolynnerization of Unsaturated Polyesters and Waste Fiber-Reinforced Plastics by using Ionic Liquids: The Use of Microwaves to Accelerate the Reaction Rate", ChemSusChem 4 (2011) 644-649.*

(Continued)

*Primary Examiner* — Brittany L Raymond
(74) *Attorney, Agent, or Firm* — McDonnell Boehnen Hulbert & Berghoff LLP (57) ABSTRACT

Methods and compositions for depolymerizing the polymer component of fiber reinforced polymers to facilitate the recovery of free fibers.

24 Claims, 3 Drawing Sheets

(56) References Cited

OTHER PUBLICATIONS

Zhu et al., "A new technology for separation and recovery of materials from waste printed circuit boards by dissolving bromine epoxy resins using ionic liquid", Journal of Hazardous Materials 239-240 (2012) 270-278.
Kamimura et al., "An Efficient Method to Depolymerize Polyamide Plastics: A New Use of Ionic Liquids", Organic Letters, vol. 9, No. 13 (2007) 2533-2535.
Kamimura et al., "Depolymerization of Unsaturated Polyesters and Waste Fiber-Reinforced Plastics by using Ionic Liquids: The Use of Microwaves to Accelerate the Reaction Rate", ChemSusChem 4 (2011) 644-649.
Zhang et al., "Microwave Deploymerization of DGEBA/EDA Epoxy Resin in Ionic Liquid", Applied Mechanics and Materials, vol. 692 (2014) 245-250.
Zhang et al., "Physical Properties of Ionic Liquids: Database and Evaluation", J. Phys. Chem. Ref. Data, vol. 35, No. 4 (2006) 1475-1517.

\* cited by examiner

CARBON FIBER RECOVERY COMPOSITIONS AND METHODS

FIELD

The present disclosure describes compositions that depolymerize the polymer component of fiber reinforced polymers as well as methods of using the compositions to recover free fibers from fiber reinforced polymers components.

BACKGROUND

Fiber reinforced polymers (FRPs) are widely used to create structural elements and parts used in aerospace, automotive, watercraft, sporting goods, and civil/structural engineering applications among others. FRPs are strong, light-weight materials with high strength-to-weight ratios. FRPs typically are formed by combining fibers and an uncured binding thermosetting polymer or resin and then curing the binding polymer or by combining fibers with a thermoplastic resin by melt infusion under heat and pressure. Some non-limiting examples of FRPs include carbon fiber reinforced polymers (CFRPs) and glass fiber reinforced polymers.

The wide use of FRPs has led to waste disposal issues and a demand for FRP recycling. In addition, certain reinforcing materials such as carbon fibers are expensive making their recovery and reuse economically desirable.

Three general recycling methods that disrupt the polymer matrix have been used to recover free fibers from FRPs: mechanical, thermal, and chemical recycling. Mechanical FRP recycling uses mechanical methods such as grinding to convert large FRP pieces into small pieces and particles, ultimately resulting in resin-rich powders and very small fibers. A problem with mechanical recycling is that the polymer cannot be separated from the fibers and fiber length cannot be controlled. As a result, recovered fibers are of little value.

Thermal FRP recycling typically entails pyrolyzing FRPs in a controlled oxygen environment at very high temperatures to combust the polymer and leave recoverable fibers. Because pyrolysis occurs at very high temperatures, recovered fibers are often weakened and charred during the recycling process.

Chemical recycling converts the polymer portion of recycled FRPs into oligomers or monomers through depolymerizing the polymer matrix via a process requiring supercritical or near-supercritical pressure, through depolymerization under heat and pressure with an alkaline catalyst, or through the use of ionic liquids at atmospheric pressure. Alkaline catalysis recovery is slow and often results in incomplete removal of resin components. At supercritical pressures, chemical recycling is expensive and dangerous. Additionally, ionic liquids that are capable of depolymerizing FRPs are expensive and susceptible to degradation through oxidation and ionization.

The volume of FRP's entering the waste stream from composite material disposal is expected to grow. In addition, the value of the FRP fiber components such as carbon fibers can be quite high if they can be recovered in useful amounts and lengths. Therefore, there is a need for environmentally friendly and inexpensive FRP recycling processes that can recover salable fibers.

SUMMARY

The present disclosure describes examples related to processes and compositions that facilitate the separation and recovery of free fibers from fiber reinforced polymer materials.

One example is a method for recovering free fibers from a fiber reinforced polymer comprising: admixing a fiber reinforced polymer with a depolymerization composition comprising at least one ionic salt and at least one protective compound that protects the ionic salt from degradation to form a recycle admixture; and heating the recycle admixture to processing temperature at which the at least one protective compound is molten and at which the at least one ionic salt dissolves in the at least one protective compound and maintaining the recycle admixture at the processing temperature for a period of time sufficient to at least partially depolymerize a portion of the fiber reinforced polymer to yield free fiber and decomposed polymer In another example, this is a depolymerization composition comprising an ionic salt and at least one protective compound that protects the ionic salt from degradation to form a recycle admixture wherein the admixture has a temperature at which the at least one protective compound and the ionic salt are each fluids.

DESCRIPTION

Methods and compositions for recovering fibers from fiber reinforced polymers are disclosed using fiber recovery compositions including one or more ionic salts that form an ionic liquid and at least one compound that protects the ionic salt and/or liquid from being degraded at fiber recovery process conditions.

Compositions useful for depolymerizing the polymer portion of FRP's to facilitate recovery of the fiber FRP component or "free fibers" include one or more ionic salts. Useful ionic salts are those that form an ionic liquid, alone or in combination with the at least one organic compound, at fiber recovery process condition. Useful ionic salts are salts in which the ions are poorly coordinated, which results in their being molten below about 400° C. Moreover, the ionic salts will have at least one ion that has a delocalized charge and one component that is organic, which prevents the formation of a stable crystal lattice. The mechanism of cured resin decomposition was investigated and without being bound to a particular theory, it is believed that the ionic liquid chemically interacts—without being consumed—with the polymer/resin portion of a FRP/CFRP to accelerate polymer/resin decomposition and fiber liberation.

The term "one or more" as used herein means that a single listed compound, ion, atom, moiety and so forth must be selected and that optionally more than one—a second, third, fourth and so on—compound, ion, atom, moiety and so forth may be selected or used.

Generally the at least one ionic salt will contain at least one of C, H, N, or P and it may contain more than one of these atoms. In one example, the ionic salt will include one or more than one of a phosphonium ion, ammonium ion, hexafluorophosphate ion, imidazolium ion, pyrrolidinium ion, pyridinium ion, imide ion, sulfonate ion, and trifluoromethane sulfonyl imide (TFSI) ion. Such ions are useful for stabilizing the ionic salt against decomposition. An especially useful ion is a phosphonium ion because the phosphorous in the ion reduces the flammability of the ionic salt.

Additionally, the ionic salt may include at least one phenyl group wherein "phenyl" as used herein refers to unsubstituted phenyl or phenyl substituted with halogen, nitrate, sulfonic acid, phenyl, propyl, methyl, ethyl, alkenyl, alkyl and aldehyde. The term "aldehyde" as used herein refers to a compound containing one or more aldehyde (—CHO) groups such as formaldehyde, paraformaldehyde, glutaraldehyde and glyoxal. The phenyl group maintains the efficacy of the ionic salt by protecting the salt from being oxidized.

In another example, the ionic salt may be one or more of 3-[2-(4-nitro-phenyl)-2-oxoethyl]-1-methylimidazolium ($C_{12}H_{14}N_3O_2$); 3-[2-(3-chlorophenyl)-2-oxoethyl]-1-methylimidazolium ($C_{12}H_{12}ClN_2O_2$); 3-[2-(4-chlorophenyl)-2-oxoethyl]-1-methylimidazolium ($C_{12}H_{12}ClN_2O_2$); 1-ethyloxy-3-[4-nitrobenzyl] imidazolium ($C_{12}H_{14}N_3O_3$); 1-methyloxy-3-[2-(4-chlorophenyl)-2-oxoethyl]imidazolium ($C_{12}H_{12}ClN_2O_2$); 3-[2-(4-nitro-phenyl)-2-oxoethyl]-1-methylimidazolium ($C_{12}H_{12}NO_3$); 1-etheneoxy-3-[2,4-dichlorobenzyl] imidazolium ($C_{12}H_{11}Cl_2N_2O$); 1-ethyloxy-3-[2,4-dichlorobenzyl] imidazolium ($C_{12}H_{13}C_{12}N_2O$); 3-[2-(3,4-dichlorophenyl)-2-oxoethyl]-1-methylimidazolium ($C_{12}H_{11}Cl_2N_2O$); 1-hydrocinnamyl-3-methyl imidazolium ($C_{13}H_{17}N_2$); 1-nonyl-3-methylimidazolium ($C_{13}H_{25}N_2$); 1-octyl-3-ethylimidazolium ($C_{13}H_{25}N_2$); 1,3-di-(1-butoxymethyl)imidazolium ($C_{13}H_{25}N_2O_2$); 1-Methyl-3-(2-oxo-2-o-tolyl-ethyl)-imidazolium ($C_{13}H_{15}N_2O$); 1-(4-methoxynbutyl)-3-methylimidazolium ($C_9H_{17}N_2O$); 1-[2-(2-methoxyethoxy)ethyl]-3-methyl imidazolium ($C_9H_{17}N_2O_2$); 1,3-dibenzylimidazolium ($C_{10}H_{10}N_2$); 1-hexyl-3-methylimidazolium ($C_{10}H_{19}N_2$); 1-[2-phenyl-2-oxyethyl]-3-methyl imidazolium ($C_{10}H_{11}N_2O$); 1-(3-cyanopropyl)-3-(2-cyano-ethyl)imidazolium ($C_{10}H_{13}N_4$); 1-(2-furan-2-yl-2-oxo-ethyl)-3-methylimidazolium ($C_{10}H_{11}N_2O_2$); 1-hydroxy-3-[2,4-dichlorobenzyl]imidazolium ($C_{10}H_9C_{12}N_2O$); 1-benzyl-3-methylimidazolium ($C_{11}H_{13}N_2$); 1-benzyl-3-methylimidazolium ($C_{11}H_{13}N_2$); 1-heptyl-3-methylimidazolium ($C_{11}H_{21}N_2$); 1-hexyl-3-ethylimidazolium ($C_{11}H_{21}N_2$), 1,3-dibutylimidazolium ($C_{11}H_{21}N_2$), 1-(4-methoxyphenyl)-3-methylimidazolium ($C_{11}H_{13}ON_2$); phenyl-3-methylimidazolium ($C_{12}H_{15}N_2$); 1-methyl-3-(3-methyl-benzyl)-imidazolium ($C_{12}H_{15}N_2$); 1-methyl-3-(2-methyl-benzyl)-imidazolium ($C_{12}H_{15}N_2$); 3-[2-(4-bromo-phenyl)-2-oxoethyl]-1-methyl imidazolium ($C_{12}H_{12}BrN_2O$); 1-octyl-3-methylimidazolium ($C_{12}H_{23}N_2$); phenylethanoyl-3-propylimidazolium ($C_{12}H_{15}N_2O$); heptoxymethyl-3-methylimidazolium ($C_{12}H_{23}N_2O$); 3-[2-(2-florophenyl)-2-oxoethyl]-1-methyl imidazolium ($C_{12}H_{12}FN_2O$); 1-(1-propoxymethyl)-3-(1-butoxymethyl) imidazolium ($C_{12}H_{23}N_2O_2$); 3-(4-Cyano-benzoyl)-1-methyl imidazolium ($C_{13}H_{12}N_3O$); 3-[2-(4-methyloxyphenyl)-2-oxoethyl]-1-methyl imidazolium ($C_{13}H_{15}N_2O_2$); 3-[2-(2-methyloxyphenyl)-2-oxoethyl]-1-methylimidazolium ($C_{13}H_{15}N_2O_2$); 1-ethyloxy-3-[2-(4-chlorophenyl)-2-oxoethyl]imidazolium ($C_{13}H_{14}ClN_2O_2$); 1-hydroxy-3-(3,4,5-trimethyloxybenzyl)imidazolium ($C_{13}H_{17}N_2O_4$); 1-ethyl-3-[2-(4-bromo-phenyl)-2-oxoethyl]imidazolium ($C_{13}H_{14}BrN_2O$); 1-methyl-3-[2,6-(S)-dimethylocten-2-yl] imidazolium ($C_{14}H_{25}N_2$); 1-octyl-3-propylimidazolium ($C_{14}H_{27}N_2$); 1-decyl-3-methylimidazolium ($C_{14}H_{27}N_2$); 3-[2-(1,2-dimethyloxyphenyl)-2-oxoethyl]-1-methylimidazolium ($C_{14}H_{17}N_2O$); 3-(1,1-dimethyl-2-phenyl-2-oxoethyl)-1-methylimidazolium ($C_{14}H_{17}N_2O$); 3-[2-(3,5-dimethoxylphenyl)-2-oxoethyl]-1-methylimidazolium ($C_{14}H_{17}N_2O_3$); 3-[2-(3,4-dimethyloxyphenyl)-2-oxoethyl]-1-methylimidazolium ($C_{14}H_{17}N_2O$); 1-(1-nonoxymethyl)-3-methylimidazolium ($C_{14}H_{27}N_2O$); 3-[2-(3-ethoxylphenyl)-2-oxoethyl]-1-methylimidazolium ($C_{14}H_{17}N_2O_2$); 3-[2-(4-ethoxylphenyl)-2-oxoethyl]-1-methylimidazolium ($C_{14}H_{17}N_2O_2$); 1-(1-amyloxymethyl)-3-butoxymethyl imidazolium ($C_{14}H_{17}N_2O_2$); 1-amyl-3-benzylimidazolium ($C_{15}H_{21}N_2$); 1-(1-hexyloxymethyl)-3-(1-butoxymethyl) imidazolium ($C_{15}H_{29}N_2O_2$); 1-undecyl-3-methylimidazolium ($C_{15}H_{29}N_2$); 1-(1-decyloxymethyl)-3-methylimidazolium ($C_{15}H_{29}N_2O$); 3-[2-(3-propyloxylphenyl)-2-oxoethyl]-1-methyl imidazolium ($C_{15}H_{19}N_2O_2$); 3-[2-(3-methyloxylphenyl)-2-oxoethyl]-1-isopropylimidazolium ($C_{15}H_{19}N_2O_2$); 3-[2-(2,4,6-trimethyloxyphenyl)-2-oxoethyl]-1-methylimidazolium ($C_{15}H_{19}N_2O_2$); 3-[2-α-naphthyl-2-oxoethyl]-1-methylimidazolium ($C_{16}H_{15}N_2O$); 1-(1-heptyloxymethyl)-3-(1-butoxymethyl)imidazolium) imidazolium ($C_{16}H_{31}N_2O_2$); 1-dodecyl-3-methylimidazolium ($C_{16}H_{31}N_2$); 1-(1-undecyloxymethyl)-3-methylimidazolium ($C_{16}H_{31}N_2O$); 1-(2,2-dimethyllpropionyloxy)-3-[2-(4-chlorophenyl)-2-oxoethyl]imidazolium ($C_{16}H_{18}ClN_2O_3$); 1-(1-dodecyloxymethyl)-3-methylimidazolium ($C_{17}H_{33}N_2O$); 1-tridecyl-3-methylimidazolium ($C_{17}H_{33}N_2$); 1-benzyloxy-3-(2,4-dichlorobenzyl)imidazolium ($C_{17}H_{15}C_{12}N_2O$); 1-(4-benzoyl-benzyl)-3-methyl-imidazolium ($C_{18}H_{17}N_2O$); 1-tetradecyl-3-methylimidazolium ($C_{18}H_{35}N_2$); 3-[2-(3-methoxyphenyl)-2-oxoethyl]-1-phenylimidazolium ($C_{18}H_{17}N_2O_2$); 1-(1-nonyloxymethyl)-3-(1-butoxymethyl)imidazolium ($C_{18}H_{35}N_2O_2$); 1-(2-phenylethyloxy)-3-(2,5-dichiorobenzyl)imidazolium ($C_{18}H_{17}C_{12}N_2O$); 1-[2,4-dichlorophenylmethyloxyl]-3-[2-(4-chlorophenyl)-2-oxoethyl]imidazolium ($C_{18}H_{14}C_{13}N_2O$); 1-pentadecyl-3-methylimidazolium ($C_{19}H_{37}N_2$); 1-phenyloxy-3-[2-(4-dimethylamino-phenyl)-2-oxoethyl]imidazolium ($C_{19}H_{20}N_3O_2$); 1-(1-decyloxymethyl)-3-(1-butoxy methyl)imidazolium ($C_{19}H_{37}N_2O_2$); 1-hexadecyl-3-methylimidazolium ($C_{20}H_{39}N_2$); 1-(1-decyloxymethyl)-3-hexyl imidazolium ($C_{20}H_{39}N_2O$); 1-(1-undecyloxymethyl)-3-(1-butoxy methyl)imidazolium ($C_{20}H_{39}N_2O$); 1-(1-undecyloxymethyl)-3-hexyl imidazolium ($C_{21}H_{41}N_2O$), 1-octadecyl-3-methylimidazolium ($C_{22}H_{43}N_2$); 1-cosyl-3-methylimidazolium ($C_{24}H_{47}N_2$); 1-(2-(2-(2-(2-(2-(2-(methacryloyloxy) ethoxy)ethoxy)ethoxy)ethoxy)ethoxy)ethoxy)-3-ethylimidazolium ($C_{25}H_{45}O_9N_2$); polymer of PEOimidazolium; 3-dihydroxy-2-bromoimidazolium ($C_3H_4BrN_2O_2$); 1,3-dimethyl-5-chloroimidazolium ($C_5H_8ClN$); 2,4,5-trimethylimidazolium ($C_6H_{11}N_2$); 1,2,3-trimethylimidazolium ($C_6H_{11}N_2$); 1,3-dimethyl-nimtrimleimidazolium ($C_6H_8N_3S$); 1,2-dimethyl-3-ethylimidazolium ($C_7H_{13}N_2$); 1-ethyl-3,5-dimethylimidazolium ($C_7H_{13}N_2$); 1-ethyl-2,3-dimethylimidazolium ($C_7H_{13}N_2$); 1,3-dimethyl-4-methylimidazolium ($C_8H_{15}N_2$); 1,2-methyl-3-propylimidazolium ($C_8H_{15}N_2$); 1,2-ethyl-3-methylimidazolium ($C_8H_{15}N_2$); 1-propyl-2,3-dimethylimidazolium ($C_8H_{15}N_2$); 1-butyl-2,3-dimethylimidazolium ($C_9H_{17}N_2$); 3-butyl-1,5-dimethylimidazolium ($C_9H_{17}N_2$); 1,3-dimethyl-2-phenylimidazolium ($C_{11}H_{13}N_2$); 1-benzyl-2-methyl-3-propyl ($C_{13}H_{19}N_2$); 1-octyl-2,3-dimethylimidazolium ($C_{13}H_{25}N_2$); 1,3-dipropyl-2-isobutylimidazolium ($C_{13}H_{25}N_2$); 1-methyl-3-(2-phenyl-2-oxoethyl)-5-methoxyimidazolium ($C_{13}H_{15}N_2O_2$); 1,2-dimethyl-3-phenylethanoyl (p-Cl) imidazolium ($C_{13}H_{14}ClN_2O$); 1-hydroxy-2-ethyl-3-[2-(4-chloro phenyl)-2-oxoethyl]imidazolium ($C_{13}H_{14}ClN_2O$); 1-benzyl-2-methyl-3-butylimidazolium ($C_{14}H_{21}N_2$); 1-benzyl-2-methyl-3-(3-methyl) propylimidazolium ($C_{14}H_{21}N_2$); 1-benzyl-2-methyl-3-amylimidazolium ($C_{15}H_{23}N_2$); 1-decyl-2,3-dimethylimidazolium; ($C_{15}H_{29}N_2$); 1-methyl-2-n-heptyl-3-benzyl imidazolium ($C_{18}H_{27}N_2$); 1-methyl-2-(2,2-dimethyl-1-methylene-propyl)-3-(2-phenyl-2-oxyethyl) imidazolium ($C_{18}H_{23}N_2O$); 1-(2,2-dimethyl propionyloxy)-2-ethyl-3-[2-(4-chlorophenyl)-2-oxoethyl]imidazolium ($C_{18}H_{22}ClN_2O_3$); 1,3-di-[4-nitrobenzyloxy]-2-methyl imidazolium ($C_{18}H_{17}N_4O_6$); 1,3-di-[4-bromobenzyloxy]-2-methyl imidazolium ($C_{18}H_{17}Br_2N_2O_2$); 1-phenyl-2-methyl-3-[2-(4-methoxy phenyl)-2-oxoethyl]imidazolium ($C_{19}H_{19}N_2O$); 1-benzyl-2-(2-phenyl-2-oxoethyl)-3-methylimidazolium ($C_{19}H_{19}N_2O$); 1,3-dibenzyl-4-(2-hydroxyethyl) imidazolium ($C_{19}H_{21}N_2O$); benzyl-2-methyl-3-3-[2-(4-chloro phenyl)-2-oxoethyl]imidazolium ($C_{19}H_{18}ClN_2O$); 1-phenoxy-2-ethyl-3-[2-(4-chloro phenyl)-2-oxoethyl]imidazolium; ($C_{19}H_{18}ClN_2O_2$); 1,2-dimethyl-3-[2-(4-Nitro-benzoic acid)-benzyl]imidazolium ($C_{19}H_{18}N_3O_4$); 1,3-di-(2,6-dichlorobenzyloxy)-2-ethylimidazolium ($C_{19}H_{17}Cl_4N_2O_2$); 1,3-di-(2,4-dichlorobenzyloxy)-2-ethylimidazolium ($C_{19}H_{17}Cl_4N_2O_2$); 1,3-di-[4-bromobenzyloxy]-2-ethyl imidazolium ($C_{19}H_{19}Br_2N_2O_2$); 1-methyl-2-n-nonyl-3-benzylimidazolium ($C_{20}H_{31}N_2$); 1-methyl-2-phenylvinyl-3-[2-phenyl-2-oxyethyl]imidazolium ($C_{20}H_{19}N_2O$); 1-phenylethanoyl-2-styrene-3-methylimidazolium ($C_{20}H_{20}N_2O$); 1-phenyl-2-methyl-3-[2-(4-chlorophenyl)-2-oxoethyl] imidazolium ($C_{20}H_{20}N_2O$); 1-benzyl-2-methyl-3-n-decylimidazolium ($C_{21}H_{23}N_2$); 1-(4-methyloxy-benzyl)-2-methyl-13-[2-(4-methoxylphenyl)-2-oxoethyl] imidazolium ($C_{21}H_{23}N_2O_2$); 1-benzyl-2-n-undecyl-3-methylimidazolium ($C_{22}H_{35}N_2$); 1-benzyloxy-2-ethyl-3-(3,4,5-trimethyloxybenzyl)imidazolium ($C_{22}H_{27}N_2O_4$); 1-benzyl-2-methyl-3-n-tetradecyl imidazolium ($C_{25}H_{41}N_2$); 1-benzyl-2-n-undecyl-3-amylimidazolium ($C_{26}H_{43}N_2$); 1,3-dihydroxy-2-methyl-4-bromo imidazolium ($C_4H_6BrN_2O_2$); 1,3-dihydroxy-2-phenyl-4-bromo imidazolium ($C_9H_6BrN_2O_2$); 1,3-diethyl-4,5-diphenylimidazolium ($C_{19}H_{21}N_2$); 1,3-dihydroxy-2-bromo-4,5-dimethylimidazolium ($C_5H_8BrN_2O_2$); 1,3-dimethyl-2,4,5-tri-bromo imidazolium ($C_5H_6Br_3N_2$); 1,2,3,4,5-penta methylimidazolium ($C_8H_{15}N_2$); α,ω-dimethyl bromide ($C_{10}H_{18}N_4Br_2$); α,ω-dipropyl bromide ($C_{11}H_{20}N_4Br_2$); α,ω-dibutyl bromide ($C_{12}H_{22}N_4Br_2$); α,ω-dihexyl bromide ($C_{14}H_{26}N_4Br_2$); α,ω-bimethylbis((trifluoromethyl)sulfonyl)imide ($C_{14}H_{18}F_{12}S_4O_8N_6$); α,ω-diimpropyl bis((trifluoro methyl) sulfonyl)imide ($C_{15}H_{20}F_{12}S_4O_8N_6$); α,ω-diimbutyl bis((trifluoro methyl)sulfonyl)imide ($C_{16}H_{22}F_{12}S_4O_8N_6$); 1-butyl-3-methylbenzotriazolium ($C_{11}H_{16}N_3$); 1-benzyl-3-methylbenzotriazolium ($C_{14}H_{14}N_3$); N,N-dimethylpyrrolidinium ($C_6H_{14}N$); N-methyl-N-ethyl-pyrrolidinium ($C_7H_{16}N$); N-methyl-N-propyl-pyrrolidinium ($C_8H_{18}N$); N-methyl-N-butyl-pyrrolidinium ($C_9H_{20}N$); N-methyl-N-hexyl-pyrrolidinium ($C_{11}H_{24}N$); N-methyl-N-propylpimperidinium ($C_9H_{20}N$); 1-ethyl-2-methylpyrrolidinium ($C_7H_{14}N$); 1-propyl-2-methylpyrrolidinium ($C_8H_{16}N$); 1-butyl-2-methylpyrrolimnimum ($C_9H_{18}N$); n-butyl pyridinium ($C_9H_{14}N$); 4-methyl-N-butylpyridinium ($C_{10}H_{16}N$); n-hexyl pyridinium ($C_{11}H_{18}N$); n-octyl pyridinium ($C_{13}H_{22}N$); n-decyl pyridinium ($C_{15}H_{26}N$) n-dodecyl pyridinium ($C_{17}H_{30}N$); 1-dodecyl-3-methylpyridinium ($C_{18}H_{32}N$); 1-dodecyl-4-methylpyridinium ($C_{18}H_{32}N$); n-tetradecyl pyridinium ($C_{19}H_{34}N$); 1-tetradecyl-3-methylpyridinium ($C_{20}H_{36}N$); 1-tetradecyl-4-methylpyridinium ($C_{20}H_{36}N$); n-hexadecyl pyridinium ($C_{21}H_{38}N$); 1-hexadecyl-3-methylpyridinium ($C_{22}H_{40}N$); 1-hexadecyl-4-methylpyridinium ($C_{22}H_{40}N$); n-octadecyl pyridinium ($C_{23}H_{42}N$); 1-octadecyl-3-methylpyridinium ($C_{24}H_{44}N$); 1-octadecyl-4-methylpyridinium ($C_{24}H_{44}N_2$); N-butyl-isoquinolinium ($C_{13}H_{16}N$); N-hexyl-isoquinolinium ($C_{15}H_{20}N$); N-octyl-isoquinolinium ($C_{17}H_{24}N$); N-decyl-isoquinolinium ($C_{19}H_{28}N$); N-dodecyl-isoquinolinium ($C_{21}H_{32}N$); N-tetradecyl-isoquinolinium ($C_{23}H_{36}N$); N-hexadecyl-isoquinolinium ($C_{25}H_{40}N$); N-octadecyl-isoquinolinium ($C_{27}H_{44}N$); 4-ethyl-2-isopropyl-3-butyl-4,5-dihydro-thiazolium ($C_{12}H_{24}NS$); 4-ethyl-2-isopropyl-3-dodecyl-4,5-dihydrothiazolium ($C_{20}H_{40}NS$); tri-methylsulfonium ($C_3H_9S$); tri-ethylsulfonium ($C_6H_{15}S$); tetra-methylsulfonium ($C_8H_{20}S$); tri-butylsulfonium ($C_{12}H_{27}S$); tetrammoniumethylammonium ($C_4H_{12}N$); trimethyl-ethynyl ammonium ($C_5H_{10}N$); trimethylethylammonium ($C_5H_{14}N$); trimethyl-methoxymethylammonium ($C_5H_{14}NO$); trimethyl-propargyl ammonium ($C_6H_{12}N$); trimethyl-allylammonium ($C_6H_{14}N$); trimethylpropylammonium ($C_6H_{16}N$); trimethyl-isopropylammonium ($C_6H_{16}N$); dimethyl-diethylammonium ($C_6H_{16}N$); dimethylethylmethoxymethyleneammonium ($C_6H_{16}NO$); methoxymethylenedimethylethylammonium ($C_6H_{16}NO$); dimethyl-ethyl-propylammonium ($C_7H_{18}N$); trimethyl-butylammonium ($C_7H_{18}N$); triethyl-methylammonium ($C_7H_{18}N$); ethoxymethylene-dimethyl-ethyl ammonium ($C_7H_{18}NO$); methoxyethyl-dimethyl-ethylammonium ($C_7H_{18}NO$); tetraethylammonium ($C_8H_{20}N$); dimethyl-ethyl-butylammonium ($C_8H_{20}N$); ethoxyethyl-dimethyl-ethylammonium ($C_8H_{20}NO$); dimethyl-propyl-butylammonium ($C_9H_{22}N$); trimethyl-hexylammonium ($C_9H_{22}N$); methyl-ethyl-dipropylammonium ($C_9H_{22}N$); diethyl-di(iso)propylammonium ($C_{10}H_{24}N$); trimethyl-heptylammonium ($C_{10}H_{24}N$); trimethyl-octylammonium ($C_{11}H_{26}N$); triethyl-(2-methylbutyl)ammonium ($C_{11}H_{26}N$); tetrapropylammonium ($C_{12}H_{28}N$); triethyl-hexylammonium ($C_{12}H_{28}N$) triethyl-heptylammonium ($C_{13}H_{30}N$); triethyl-octylammonium ($C_{14}H_{32}N$); di(iso)propylethylheptylammonium ($C_{15}H_{34}N$); tetrabutylammonium ($C_{16}H_{36}N$); tributyl-hexylammonium ($C_{18}H_{40}N$); tributyl-heptylammonium ($C_{19}H_{42}N$); tributyl-octyl ammonium ($C_{20}H_{44}N$); tetramyl ammonium ($C_{20}H_{44}N$); tetrahexyl ammonium ($C_{24}H_{52}N$); trioctyl-propyl ammonium ($C_{27}H_{58}N$); tetraheptyl ammonium ($C_{28}H_{60}N$); triyl-tetradecyl ammonium ($C_{29}H_{62}N$); tetraoctyl ammonium ($C_{32}H_{68}N$); trihexyl-tetradecyl ($C_{32}H_{68}N$); tridodecyl-methyl ammonium ($C_{37}H_{78}N$); tetradecyl ammonium ($C_{40}H_{84}N$); [bis(butyl-methyl-amino)-methylene] dimethylammonium ($C_{13}H_{30}N_3$); [bis(butyl-ethyl-amino)-methylene] dimethyl-ammonium ($C_{15}H_{34}N_3$); [bis(bis-butyl-amino)-methylene] dimethyl-ammonium ($C_{19}H_{42}N_3$); [bis(bis-hexyl-amino)-methylene] dimethylammonium ($C_{23}H_{50}N_3$); [bis(bis-octyl-amino)-methylene]dimethyl-ammonium ($C_{27}H_{58}N_3$); tetraethylphosphonium ($C_4H_{12}P$); tetraethylphosphoniumimethylene-1,4,10,13-tetrakisazacycloheptadecane ($C_8H_{20}P$); tridecylmethylphosphonium ($C_{31}H_{66}P$); trihexyl-tetradecylphosphonium ($C_{32}H_{68}P$); tetra-methyl arsenic ($C_4H_{12}As$); 1,1,6,6-tetramethyl-3-yn-1,6-diazecanediaminium ($C_{12}H_{24}N_2$); (z)-1,1,6,6-tetramethyl-3-en-1,6-diazecanediaminium ($C_{12}H_{26}N_2$); 1,1,6,6-tetramethyl-1,6-diazecanediaminium ($C_{12}H_{28}N_2$); N-(2-(((3-hydroxypropyl)dimethylammonio)methyl)benzyl)-3-hydroxy-N,N-dimethylpropyl-1-aminium ($C_{18}H_{34}O_2$); (1,4),(1,4),(9,12),(9,12)-tetradimethylene-6-en-1,4,9,12-tetrakisazacyclohexadecane tetraminium ($C_{20}H_{38}N_4$); 6,8-(1',3'-phenylene)-(1,4),(1,4),(10,13),(10,13)-tetradimethylene-1,4,10,13-tetrakisazacycloheptadecanetetraminium ($C_{24}H_{36}N_4$); 6,8-(1',3'-phenylene)-(1,4),(1,4),(10,13),(10,13)-tetradimethylene-1,4,10,13-tetrakisazacyclotricosanetetraminium ($C_{30}H_{52}N_4$); tetraphenylphosphonium bis(trifluoromethanesulfonyl) imide and tetraphenylphosphonium bromide, lithium bis(trifluoromethanesulfonyl)imide; tetrabutylphosphonium methane sulfonate; tetrabutylphosphonium tetrafluoroborate; tetrabutylphosphonium p-toluenesulfonate; trihexyltetradecylphosphonium bis(trifluoromethylsulfonyl)amide; trihexyltetradecylphosphonium bis(2,4,4-trimethylpentyl)phosphinate; trihexyltetradecylphosphonium bromide; trihexyltetradecylphosphonium chloride; trihexyltetradecylphosphonium decanoate; trihexyltetradecylphosphonium dicyanamide; 3-(Triphenylphosphonio)propane-1-sulfonate; 3-(triphenylphosphonio)propane-1-sulfonic acid tosylate.

In another example, the ionic salt is one or more of 3-(Triphenylphosphonio)propane-1-sulfonate, 3-Triphenylphosphonio)propane-1-sulfonic, and acid tosylate.

The compositions useful for recovering free fibers from FRP's further include at least one protective compound that protects the ionic salt from being degraded or destroyed. Because of the possible high cost of the useful ionic salts, it can be important to inhibit or to prevent the ionic salt from being degraded or destroyed during the FRP fiber recovery process. For example, ionic salts can be oxidized when exposed to an oxidizing agent such as water and degraded into unwanted byproducts. In an example, the protective compound will inhibit the degradation and/or decomposition of the ionic salt by at least 50% during a FRP depolymerization, more preferably by at least 80% or by at least 95% or more and most preferably by at least 99% or more.

The at least one protective compound can be a sacrificial compound that reacts preferentially—in comparison to the one or more ionic salts—with water, oxygen and/or other components in the FRP's thereby at least inhibiting the degradation of the at least one ionic salt. In one example, the sacrificial compound is an organic compound, a phosphorous compound, a sulfur compound and any combination thereof, including multiple organic compounds, phosphorous compounds, and sulfur compounds, that are oxidized preferentially—in comparison to the at least one ionic salt—such as by reacting with water, oxygen and or other oxidizing agents present in an FRP depolymerization admixture to form an oxidized organic material.

In one example, the at least one sacrificial compound will be one or more organic compounds including an uncharged organic molecule that contains at least carbon and hydrogen atoms. Examples of such uncharged organic molecules include triphenylphosphine, trialkylphoshine wherein the alkyl group has at least four carbon atoms, triphenylmethane, 4-(dimethylamino)phenyldiphenylphosphine, triphenylamine, N-methylimidiazone, diphenyl amine, oleyl amine, diphenyl sulfide and combinations thereof.

The combination of the at least one ionic salt and the at least one protective compound together form a depolymerization composition. The amount of each ingredient present in the depolymerization composition can vary widely from about 1 to about 99 wt %. Due to the possible high cost of the useful ionic salts and because satisfactory depolymerization that liberates free fibers can occur even when small amounts of ionic salt are present, the depolymerization composition will typically include from about 1 to about 50 wt % ionic salt and from about 50 to about 99 wt % of the at least one protective compound or alternatively from about 1 to about 10 wt % ionic salt and from about 90 to about 99 wt % of the at least one protective compound.

FRP depolymerization occurs in the presence of a liquid depolymerization composition. Since in most cases, the depolymerization composition is made up predominantly of the one or more protective compounds, then the at least one protective compound will have a melting point below and a boiling point above the processing temperature of the FRP/CFRP depolymerization process. Generally, the at least one protective compound will have a melting point that is no greater than about 150° C. and a boiling point that is greater than about 400° C. In another example, the at least one protective compound will have a melting point that is no greater than about 250° C. and a boiling point that is greater than about 350° C.

As noted above, the depolymerization composition will be a "fluid" at the useful processing temperatures. The term "fluid" is used to refer to depolymerization compositions and/or composition ingredients that are in a liquid or molten form. Thus, it is possible for the depolymerization ingredients to be individually all liquid, individually all molten or be a combination of molten and liquids at processing temperatures.

For example, the ionic salt will be a fluid (an ionic liquid) at the FRP/CFRP processing temperature. The ionic salt can be in the firm of an ionic liquid at the processing temperature by virtue of having a melting point that is no greater than about 150° C. and a boiling point that is greater than about 400° C. or more narrowly a melting point that is no greater than about 300° C. and a boiling point that is greater than about 400° C. Alternatively, the ionic salt can be soluble in the one or more protective compounds which in turn are fluid(s) at the FRP/CFRP processing temperature.

The methods of this disclosure are useful for recovering fibers from fiber-reinforced polymers. Fiber reinforced polymers ("FRPs") are composite materials comprising at least two parts, a matrix material and a reinforcing material where the reinforcing material is a fiber. The reinforcing material gives the FRP strength while the matrix material binds the reinforcing material. Fiber-reinforced polymers include a variety of reinforcing materials such as fibers made from carbon, glass, aromatic polyamides (aramids), aluminum, ultra-high-molecular-weight polyethylene, graphite, and combinations of these. This disclosure is not limited by the type of fiber reinforcing material that is used in the FRP.

Carbon fiber reinforced polymers (CFRPs) are a species of fiber reinforced polymer materials in which reinforcing materials are carbon fibers. CFRPs may also include carbon nanotube reinforced polymers which include carbon fibers as a reinforcing material and further include carbon nanotubes as a matrix filler. In this invention embodiment, the carbon fibers and carbon nanotubes can separately be recovered via the recycling process.

The matrix material or polymer used in FRP's can be any polymer—thermosetting or thermoplastic—that are known or found to be useful in fabricating FRP's. The matrix materials are generally thermosetting resins such as epoxy resins as well as thermoset or thermoplastic polymers, such as polyester, vinyl ester, phenol formaldehyde resins and nylon resins.

One aspect is a method of recycling FRPs to recover reinforcing material fibers and to optionally recover filler material(s). The method includes combining FRP's with a depolymerization composition including at least one ionic salt and at least one protective compound to at least partially decompose the fiber-reinforced polymer matrix material. The useful ionic salts and protective compounds are selected from one or more of those described above. The depolymerization composition disrupts and degrades the cross-linking of the cured resin that forms the FRP's and carbon fiber reinforced plastics (CFRP) and converts them into a soluble or semi-soluble material and liberates the fiber reinforcement as loose fiber.

The terms "decompose" and "depolymerize" are used to refer to a change in the matrix material that occurs as the result of contacting the FRP with the depolymerization composition. Upon contacting the FRP with a depolymerization composition at the recited temperature, the ionic salt in the depolymerization composition is believed to disrupt the matrix material cross-linking thereby incrementally reducing the molecular size of the polymer to the point that part to all of the fiber reinforcement can be separated from the "decomposed" or "depolymerized" matrix material as free fiber.

Before recycling, the FRP's may be size reduced. Many FRP's such as CFRP's are quite large—greater that 1 foot×1 foot—as they are used to form structural elements and body parts for aircraft and automobiles, they are used in sporting goods and they have civil engineering uses. Thus, in order to be recycled it may be necessary to reduce the FRP's to a size of 1 foot×1 foot or less, and preferably 6 inches×6 inches or less so that the pieces being recycled can easily be combined with a depolymerization composition in a recycling vessel should the vessel be smaller than the FRP that is being recycled. This results in useful salable free fibers having lengths of from 1 inch to 12 inches and preferably from about 3 inches to 6 inches in length.

The combination of FRP's with a depolymerization composition forms a recycle admixture. The recycle admixture is heated to a processing temperature at which the at least one organic compound is molten and at which the at least one ionic salt dissolves in the at least one organic compound. At the processing temperature the depolymerization composition including the ionic salt is in a molten or liquid form which can readily contact the FRP and depolymerize the FRP matrix material. In particular, the recycle admixture processing temperature will range from about 150° C. to about 400° C. and more particularly from about 300° C. to about 400° C. The recycle admixture processing temperature is typically a temperature at which the depolymerization composition is molten or liquid which allows the composition to penetrate into the FRP and facilitate FRP depolymerization.

One factor that can impact processing temperature is the type of polymer that is used in the FRP. For example, FRPs used in the automotive industry employ lower cost polymers with lower average molecular weights. These FRP's can be successfully depolymerized by depolymerization compositions heated to at least 150° C. In contrast, FRPs used in the aviation industry, e.g., aviation grade CFRPs, typically include polymers with high average molecular weights, high glass transition temperatures, and/or a high degree of cross linking which can require heating the depolymerization composition containing recycle admixture to a temperature of at least 325° C. to successfully recover free fibers from the CFRPs. Therefore, the minimum temperature at which the recycle admixture may be liquid can be at least 150° C.

The recycle admixture should be maintained at the processing temperature for a period of time that is sufficient to at least partially decompose the polymer matrix portion of the FRP to form an at least partially decomposed polymer and liberated free fibers. Typically the longer the recycle admixture is held at the processing temperature the more complete the FRP depolymerization. The depolymerization rate will depend upon a variety of factors including one or more of the chosen ionic salt(s), the chosen protective compound(s), the type of matrix material that is being decomposed and the processing temperature. The period of time that is sufficient to at least partially decompose the polymer matrix portion of the FRP to form an at least partially decomposed polymer and liberated free fibers may be from at least 5 minutes and up to 3 hours or more. In one alternative, the sufficient period of time during which the admixture is held at an elevated temperature is at least 5 minutes and up to 120 minutes.

The depolymerization process may be performed in air or in an oxygen free or inert atmosphere. Using an oxygen free or inert atmosphere can reduce the decomposition of the ionic salt via oxidation.

Free fibers are separated from the recycle admixture any time after the FRP/CFRP polymer matrix becomes at least partially decomposed. Free fibers can be separated while the recycle admixture is at an elevated temperature, while the recycle admixture is being cooled or after the recycle admixture is cooled to about room temperature (68° F.) or below. The "free fibers" are those fibers that become disengaged from the FRP as a result of contacting the FRP with the depolymerization composition.

Free fibers can include residual decomposed polymer. Therefore, after separating free fibers from the recycle admixture, the free fibers may be washed one or more times with a wash solvent to remove at least some to all residual decomposed polymer associated with the free fiber. The wash solvent can be any liquid or solution in which the decomposed polymer is soluble or that can otherwise remove residual decomposed polymer from the free fiber. Examples of useful wash solvents include acetone, tetrahydrofuran, ethyl acetate, toluene, methanol, ethanol, propanol, isopropyl alcohol, n-butanol, t-butanol, methyl-t-butyl ether and compatible mixtures thereof.

In one example, free fiber is separated from the recycle admixture while it is at an elevated temperature to yield a partially spent recycle admixture containing a depolymerization composition and protective compound. A second piece of FRP can then be placed in the partially spent recycle admixture to form a second recycle admixture. Fresh depolymerization composition or individual depolymerization composition ingredients may optionally be added to the partially spent depolymerization composition either before or after the second FRP is combined with the recycle admixture following which the depolymerization process is repeated with the second piece of FRP.

The partially spent depolymerization composition may be used multiple times—with or without the addition of fresh depolymerization composition, ionic salt and\or protective compound—to sequentially depolymerize a plurality of FRP's. However, over time, decomposed polymer can accumulate in the depolymerization composition causing it to become spent and lose its effectiveness in decomposing matrix polymer. When this occurs, the spent depolymerization composition can be disposed of and the process resumed with fresh depolymerization composition.

The one or more ionic salts can be quite expensive. Therefore, before the spent depolymerization composition is disposed of, the ionic salts can be recovered from the composition for reuse. In addition, or in the alternative, the organic composition can be recovered from the spent depolymerization composition and reused.

In still another example, the at least partially spent depolymerization composition containing recycle admixture and free fibers can be combined with a wash solvent to yield a wash product before the free fiber is separated from the recycle admixture. The free fiber may remain in the wash product for a period of time (e.g., from about 5 to about 20 minutes) that is sufficient to at least partially remove residual polymer from the free fibers. The free fibers are then separated from the wash product. Separated free fibers can optionally be washed one or more times with a wash solvent as described above to remove additional residual polymer. The wash solvent can be optionally recovered from the wash product by heating the wash product to a temperature sufficient to volatilize the wash solvent. The recovered wash solvent can be reused while the remaining recovered non-volatile depolymerization composition—including decomposed polymer—can be separately reused.

In still another example, decomposed polymer is separated from the partially spent recycle admixture by admixing the at least partially spent recycle admixture with a decomposed polymer solvent. A decomposed polymer solvent is a solvent in which the decomposed polymer is soluble and in which the depolymerization composition components are partially to totally insoluble. Examples of decomposed polymer solvents include one or more of ketones, alkenes, haloalkanes, and ethers and more narrowly one or more of methyl ethyl ketone, methyl amyl ketone, tetrahydrofuran (THF), diethyl ether, methylene chloride, acetone, chloroform, toluene, and compatible mixtures thereof.

In yet another example, the decomposed polymer is extracted from the at least partially spent recycle admixture or from the wash product with a decomposed polymer precipitant. The decomposed polymer precipitant selectively precipitates the decomposed polymer and not the depolymerization composition components. Examples of useful decomposed polymer precipitants include alkanes, alkenes, and ethers and more preferably, one or more of hexane, octane, toluene, xylene, benzene, diphenyl ether, and compatible combinations thereof.

FRP's may include additives other than fibers such as inert fillers. Examples of inert fillers include carbon nanotubes, silica particles, PTFE particles, boron nitride, titanium dioxide, and other known FRP fillers. FRP fillers can be costly, thus making their recovery economically viable. Like the reinforcing materials, the fillers are inert and can be recovered from FRP's by the methods described above.

The depolymerization composition ingredients used in the recycle admixture can have a variety of origins. Each of the ionic salt and organic compound ingredients can be fresh (unused). Alternatively, they can take the form of an at least partially spent depolymerization composition including decomposed polymer. The depolymerization composition can also be the product of separating the depolymerization composition components from decomposed polymer found in an at least partially spent recycle admixture. Moreover, at least a portion to all of the depolymerization composition used in a recycle admixture may be recycled from a previous FRP depolymerization use.

EXAMPLES

Example 1

5 g of $PPh_4$-TFSI (Tetraphenylphosphonium bis(trifluormethanesulfonyl)imide) was heated to 350° C. and combined with a 1 $cm^2$ piece of 5 ply thick CFRP. After 10 minutes, free carbon fiber was recovered from the admixture. The recovered carbon fibers were obtained as black and blue colored fibers and there was little polymer residue present on the recovered fibers. The ionic liquid was recrystallized and used to treat another 1 $cm^2$ piece of 5 ply thick CFRP at the same conditions with free fibers again recovered from the admixture.

The experiment was then repeated using 5 g of fresh $PPh_4$-TFSI with a 1 $cm^2$ piece of 16 ply thick CFRP. The free fibers recovered from the 16-ply thick CFRP included some residual resin particles. These experiments demonstrated that the exact ratio of ionic liquid to resin mass is not critical.

A $^{31}P$ NMR was run on the $PPh_4$-TFSI before and after heating with CFRP to observe changes in the materials. Some ionic liquid was degraded when CFRP was present. When no CFRP was present during heating, the $PPh_4$-TFSI was unchanged. When the $PPh_4$-TFSI was reacted with CFRP at 350° C. for 10 min, 2 wt % of ionic liquid was lost by being converted into triphenylphosphine oxide and other by-products.

Since the depolymerization was performed under inert gas, these results indicate that the $PPh_4$-TFSI oxidizing material must come from heated CFRP. Because the ionic liquid costs ~$2/g, this loss of ionic liquid in each process iteration would raise the cost of recovered carbon fiber to above $20/lb and potentially make the process economically unfeasible.

Example 2

The mechanism of cured resin decomposition was investigated in this example to understand if the ionic liquid is a heat transfer fluid or chemically involved in the decomposition of cured resin in CFRP. Chemically similar materials with boiling points above the process temperature were heated with a 5 ply thick piece of CFRP at 350° C. for 10 minutes. None of the liquids performed as well in liberating fiber from the CFRP as $PPh_4$-TFSI. Table 1 below shows the $PPh_4$-TFSI promotes the decomposition of cured resin in CFRP. The data also shows that the ionic salt, which is liquid at processing temperatures, outperforms other high temperature stable fluids.

TABLE 1

| Material | Similarity to ionic liquid | Results |
| --- | --- | --- |
| Tetraphenylphosphonium bis (trifluormethanesulfonyl) imide ($PPh_4$-TFSI) | This is the same ionic liquid | Complete recovery of loose carbon fibers |
| Tetraphenylphosphonium Bromide | Cation from $PPh_4$-TFSI | 40% of carbon fibers recovered, Most plys break off CFRP |
| Lithium bis (trifluormethanesulfonyl) imide | Anion from $PPh_4$-TFSI | |
| Triphenylphosphine | Chemically very similar | CFRP breaks into |

TABLE 1-continued

| Material | Similarity to ionic liquid | Results |
| --- | --- | --- |
| (PPh₃) Triphenylmethane | Inert fluid that has similar ligands as ionic liquid | Most plys break off CFRP |
| Triphenylmethanol | Inert fluid that has similar ligands as ionic liquid | No decomposition |

The data in Table 1 suggests the $PPh_4$-TFSI ionic liquid acts as more than a heat transfer fluid in decomposing CFRP resin that it may be reacting with the resin in CFRP or accelerating the breakdown of CFRP similar to the action of a catalyst. Heat transfer fluids such as triphenylmethane or triphenylmethanol do not produce any free fibers.

Example 3

Figure 1:
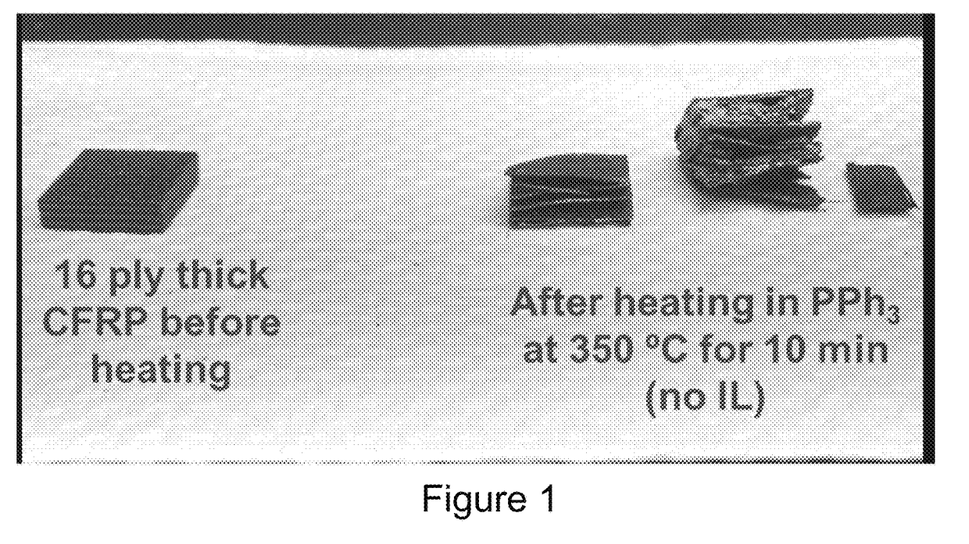
FIG. 1 shows a 16 ply thick CFRP on the left before treatment and on the right after treatment. After treatment with neat PPh3 at 350° C. for 10 min the plys expanded enabling ionic liquid to enter the CFRP structure.

To further investigate if $PPh_4$-TFSI was a reactant or catalyst for depolymerization of cured resin, the ionic liquid was diluted 20:1 (organic: $PPh_4$-TFSI) in other organic materials from Table 1. A catalyst or reactant will still work at a lower level, but if the ionic liquid was only a solvent that swells and dissolves epoxy, then we expected carbon fiber recovery to fail because of the dilution in a less solvating material. Table 2 shows that 1) the ionic liquid still depolymerized CFRP in diluted form and 2) the other organic material must both be somewhat effective in breaking down CFRP to support the process. The efficacy of PPh3, which results in depolymerization when combined with the $PPh_4$-TFSI, is shown in FIG. 1 which is a before and after photo of a 16 ply thick CFRP layer that was partially delaminated after treatment. The delamination openings allow the ionic liquid to more easily penetrate deep into the CFRP. If an organic material like triphenylmethanol is used that does not break down CFRP, diluted ionic liquid alone will not result in carbon fiber recovery. Thus the ionic salt when liquefied does not act as just a solvent because under the correct conditions it results in carbon fiber recovery in dilute form.

TABLE 2

CFRP decomposition observed upon heating with $PPh_4$-TFSI diluted with organic compound(s)

| Materials Reacted | Result of heating at 350° C. for 10 minutes |
| --- | --- |
| 5 wt % PPh4-TFSI + 95 wt % triphenylphosphine + 5 ply thick | 100% recovery of loose carbon fibers (FIG. 3, left) |
| 5 wt % PPh4-TFSI + 95 wt % triphenylphosphine + 16 ply thick | 100% recovery of loose carbon fibers with some resin residue on the surface (FIG. 3, right) |
| 5 wt % PPh4-TFSI + 95 wt % triphenylmethane + 5 ply thick | 60% of fiber recovered from epoxy as loose fibers |
| 5 wt % PPh4-TFSI + 95 wt % triphenylmethanol + 5 ply thick | No decomposition |

In all cases, a 1 cm² piece of CFRP was used with 5 g of ionic liquid+organic compound. When 5 ply CFRP was used, the resin:(ionic liquid+organic compound) weight ratio was 0.06:5, and when 16 ply CFRP was used the resin:(ionic liquid+organic compound) ratio was 0.17:5. Both reactions between 5 and 16 play CFRP with 5 wt % $PPh_4$-TFSI+95 wt % triphenylphosphine resulted in depolymerization.

Figure 2A:
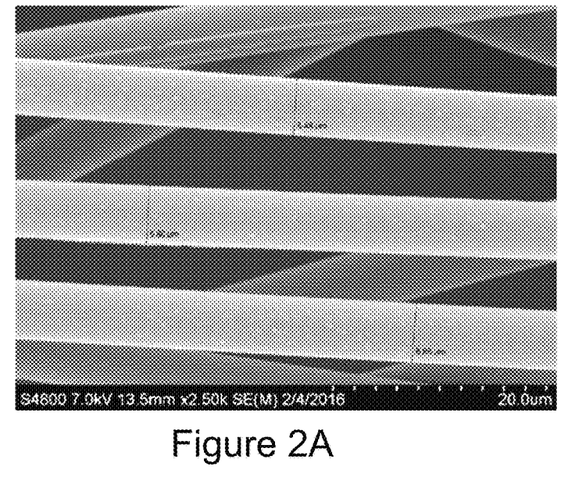
FIG. 2A is a photograph of carbon fibers with little surface residue that were recovered in Example 3 after heating a 5 ply thick CFRP with 5 wt % $PPh_4$-TFSI+95 wt % PPh3 at 350° C. for 10 min.
Figure 2B:
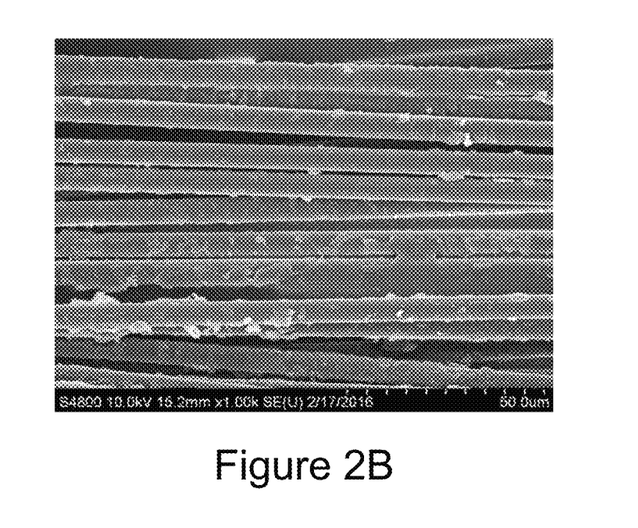
FIG. 2B is a photograph of carbon fibers with observed surface residue that were recovered in Example 3 after heating a 16 ply thick CFRP with 5 wt % $PPh_4$-TFSI+95 wt % PPh3 at 350° C. for 10 min.

FIG. 2A are carbon fibers with little surface residue that were recovered after heating 5 ply thick CFRP with 5 wt % $PPh_4$-TFSI+95 wt % PPh3 at 350° C. for 10 min. FIG. 2B are carbon fibers with some residue that were recovered after heating 16 ply thick CFRP with 5 wt % $PPh_4$-TFSI+95 wt % PPh3 at 350° C. for 10 min. Note that a 1 cm² piece of CFRP and 5 g $PPh_4$-TFSI+PPh3 was used in all experiments.

Example 4

Figure 3:
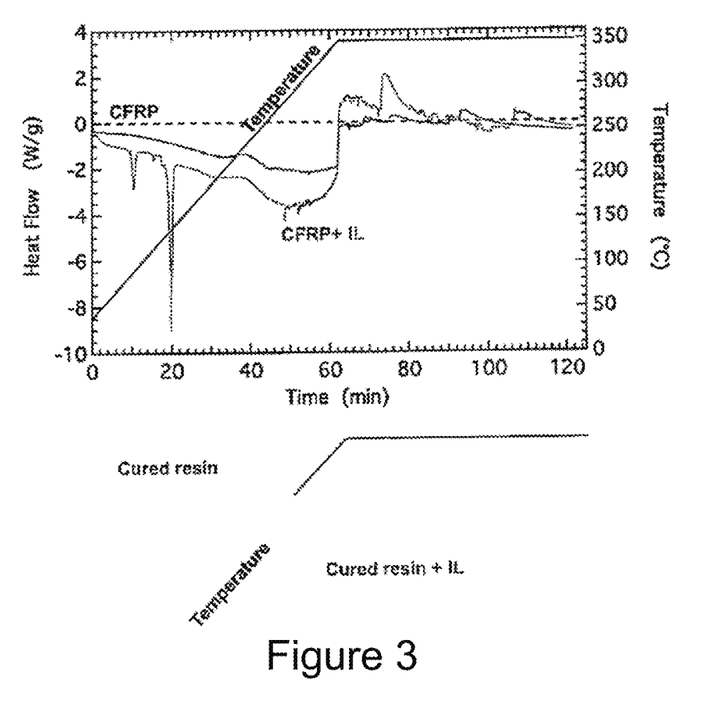
FIG. 3 shows DSC traces characterizing the interaction between the CFRP resin and the ionic liquid. a) CFRP with and without ionic liquid. b) Cured resin with and without ionic liquid. Note: these traces are shown versus time because after ramping to 350° C., the temperature was held constant for 1 hour.

To further understand the role of the behavior of the ionic liquid in the decomposition of the CFRP a series of DSC runs were performed on the CFRP with and without ionic liquid and on a sample of cured resin, extracted from prepreg, again with and without ionic liquid. The results are shown in FIG. 3.

Without the ionic liquid, the CFRP resin alone shows an endothermic (negative) feature at ~40 min followed by an exothermic direction (positive) step at 62 min (~350° C.). During the hold at 350° C., there are a series of small exothermic direction features. With the ionic liquid, qualitatively the same features are observed. The sharp features at 10 min and 20 min are from adsorbed water in the ionic liquid and its melting, respectively. The most notable difference is that the exothermic step at 62 min and the features at 350° C. are larger with the ionic liquid. Cured resin (bottom plot) shows a similar result but with the increased exothermic features (at 62 min and during the hold at 350° C.) further exaggerated. These results suggest that the ionic liquid did not initiate new reactions with the CFRP resin, but rather promotes reactions characteristic of resin pyrolysis and, therefore, behaves like a catalyst in promoting CFRP depolymerization.

Example 5

A ³¹P NMR was run on the $PPh_4$-TFSI and/or $PPh_3$ before and after heating with CFRP to observe changes in the materials. 1-3 wt % of these materials were degraded when CFRP was present, but the $PPh_4$-TFSI and $PPh_3$ were unchanged if they were heated alone.

The $PPh_4$-TFSI was reacted with CFRP at 350° C. for 10 min and lost 1-2 wt % of ionic liquid, which was transformed into triphenylphosphine oxide and other products. However, when 5 wt % $PPh_4$-TFSI+95 wt % $PPh_3$ were reacted with CFRP at 350° C. for 10 min, the ionic liquid amount was unchanged but 2.7% of $PPh_3$ was transformed—mostly into triphenylphosphine oxide with some other by-products. The $PPh_3$ is less oxidation stable than the $PPh_4$-TFSI, therefore, seems to have been preferentially decomposed during the reaction with CFRP. Because the reaction took place under an inert gas, the oxidizing material source must come from heated CFRP. The CFRP contains ~0.5 wt % water and this is the most likely oxidizing material. Thus we expect the water in CFRP to result in some loss via oxidation of the ionic salt or organic compound during FRP decomposition.

Because $PPh_4$-TFSI was essentially not consumed when combined with an organic material, it may be reused without requiring the addition of fresh ionic salt(s). This lack of consumption further suggests that the ionic salt it is not a reactant. By combining the ionic salt with a sacrificial organic compound like triphenylphosphine, the ionic liquid is preserved which lowers the process cost significantly.

Example 6

Figure 4:
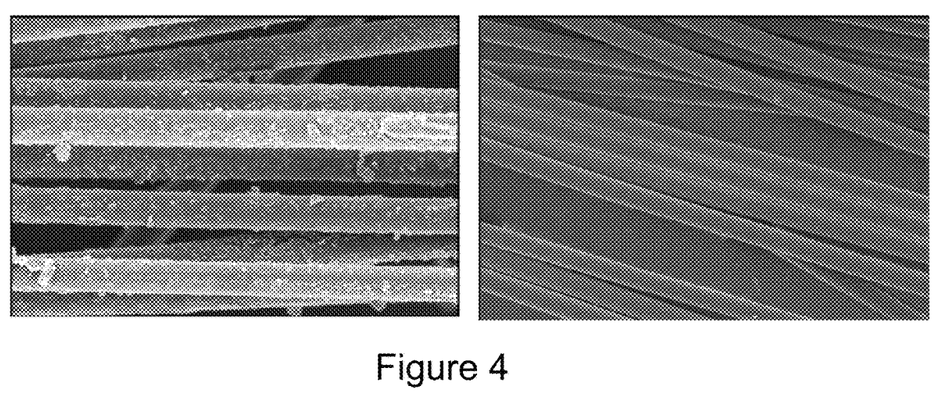
FIG. 4 shows the surface of recovered carbon fibers a) after recovery and b) after additional sonication in acetone and methanol.

Several processes were performed that produced residue free carbon fiber after CFRP depolymerization. FIG. 4 shows fibers extracted from prepreg that were treated with an ionic liquid, before (left side of FIG. 4) and after 5 min sonication treatments with acetone and methanol (right side of FIG. 4). After the depolymerization process in ionic liquid, there was still particulate residue on the surface of the fibers. After subsequent sonication the fibers were clean. Thus if the ionic liquid recovery only frees fibers from the resin, sonication can produce clean fibers for subsequent use.

In addition, the cross sections of fibers extracted from a prepreg before and after treatment in the ionic liquid were examined and there here appeared to be no change in diameter due to the ionic liquid. Thus the process does not appear to damage, etch, or swell the fibers.

Example 7

This example describes the synthesis of $PPh_4$-TFSI and its subsequent testing. Tetraphenylphosphonium bromide ($PPh_4$-Br), lithium bis(trifluormethanesulfonyl)imide (Li-TFSI), potassium triphenylphosphine (K-TFSI), triphenylmethane, and triphenylmethanol were purchased from Aldrich. 5, 16, and 32 ply thick CFRP sheets were cut into 1 cm×1 cm coupons.

$PPh_4$-TFSI was synthesized by dissolving equal molar amounts of $PPh_4$-Br and K-TFSI in hot, near boiling, water. After dissolution, the solutions were combined to yield the $PPh_4$-TFSI ionic liquid, which is insoluble even in hot water, and the by-product KBr, which is soluble in water. The $PPh_4$-TFSI was washed with excess water to remove all traces of KBr and then recrystallized by dissolution in methanol followed by precipitation by water addition. The $PPh_4$-TFSI product was characterized by differential scanning calorimetry (DSC). The DSC trace of the synthesized $PPh_4$-TFSI showed a single sharp melting transition at 134.98° C., which agrees with the accepted value. Following this initial synthesis, a second analogous procedure was performed using Li-TFSI instead of K-TFSI and the DSC trace indicated the product was $PPh_4$-TFSI.

Next, the synthesis was scaled up to an approximately 50 gram scale using Li-TFSI. DSC traces of the $PPh_4$-TFSI without and after recrystallization demonstrated a small impurity phase with a transition at ~100° C. and a slightly lower melting point of 132° C. Although not quite as pure as the small scale syntheses, a good quality $PPh_4$-TFSI product was obtained at a 50 gram scale and the synthesis procedure appears scalable to much larger quantities and in all cases produced ionic salt with 97% yield.

Having described compositions and methods of using the compositions in detail and by reference to specific examples thereof above, it will be apparent that modifications and variations are possible without departing from the scope of the disclosure defined in the appended claims. More specifically, although some aspects of the present disclosure are identified herein as particularly advantageous, it is contemplated that the present invention is not necessarily limited to these particular aspects of the disclosure.

What is claimed is:

1. A method for recovering free fibers from a fiber reinforced polymer comprising:
    admixing the fiber reinforced polymer with a depolymerization composition comprising an ionic salt and a protective compound that protects the ionic salt from degradation to form a recycle admixture; and
    heating the recycle admixture to a processing temperature at which the protective compound is molten and at which the ionic salt dissolves in the protective compound and maintaining the recycle admixture at the processing temperature for a period of time sufficient to at least partially depolymerize a portion of the fiber reinforced polymer to yield free fiber and decomposed polymer.

2. The method of claim 1 wherein the ionic salt is liquid in the depolymerization composition at a temperature below 200° C.

3. The method of claim 1 wherein the ionic salt contains at least one of C, H, N, and P.

4. The method of claim 1 wherein the ionic salt includes one or more of a phosphonium ion, ammonium ion, hexafluorophosphate ion, imidazolium ion, pyrrolidinium ion, pyridinium ion, imide on, sulfonate ion, and a trifluoromethane sulfonyl imide (TFSI) ion.

5. The method of claim 1 wherein the ionic salt includes a phosphonium ion.

6. The method of claim 1 wherein the ionic salt includes at least one phenyl group.

7. The method of claim 1 wherein the ionic salt is one or more of 3-[2-(4-nitro-phenyl)-2-oxoethyl]-1-methylimidazolium ($C_{12}H_{14}N_3O_2$); 3-[2-(3-chlorophenyl)-2-oxoethyl]-1-methylimidazolium ($C_{12}H_{12}ClN_2O$); 3-[2-(4-chlorophenyl)-2-oxoethyl]-1-methylimidazolium ($C_{12}H_{12}ClN_2O$); 1-ethyloxy-3-[4-nitrobenzyl] imidazolium ($C_{12}H_{14}N_3O_3$); 1-methyloxy-3-[2-(4-chlorophenyl)-2-oxoethyl]imidazolium ($C_{12}H_{12}ClN_2O_2$); 3-[2-(4-nitro-phenyl)-2-oxoethyl]-1-methylimidazolium ($C_{12}H_{12}NO_3$); 1-etheneoxy-3-[2,4-dichlorobenzyl] imidazolium ($C_{12}H_{11}Cl_2N_2O$); 1-ethyloxy-3-[2,4-dichlorobenzyl] imidazolium ($C_{12}H_{13}C_{12}N_2O$); 3-[2-(3,4-dichlorophenyl)-2-oxoethyl]-1-methylimidazolium ($C_{12}H_{11}Cl_2N_2O$); 1-hydrocinnamyl-3-methyl imidazolium ($C_{13}H_{17}N_2$); 1-nonyl-3-methylimidazolium ($C_{13}H_{25}N_2$); I-octyl-3-ethylimidazolium ($C_{13}H_{25}N_2$); 1,3-di-(1-butoxymethyl)-imidazolium ($C_{13}H_{25}N_2O_2$); 1-Methyl-3-(2-oxo-2-o-tolyl-ethyl)-imidazolium ($C_{13}H_{15}N_2O$); 1-(4-methoxynbutyl)-3-methylimidazolium ($C_9H_{17}N_2O$); 1-[2-(2-methoxyethoxy)ethyl]-3-methyl imidazolium ($C_9H_{17}N_2O_2$); 1,3-dibenzylimidazolium ($C_{10}H_{10}N_2$); 1-hexyl-3-methylimidazolium ($C_{10}H_{19}N_2$); 1-[2-phenyl-2-oxyethyl]-3-methyl imidazolium ($C_{10}H_{11}N_2O$); 1-(3-cyanopropyl)-3-(2-cyano-ethyl)imidazolium ($C_{10}H_{13}N_4$); 1-(2-furan-2-yl-2-oxo-ethyl)-3-methylimidazolium ($C_{10}H_{11}N_2O_2$); 1-hydroxy-3-[2,4-dichlorobenzyl]imidazolium ($C_{10}H_9C_{12}N_2O$); 1-benzyl-3-methylimidazolium ($C_{11}H_{13}N_2$); 1-benzyl-3-methylimidazolium ($C_{11}H_{13}N_2$); 1-heptyl-3-methylimidazolium ($C_{11}H_{21}N_2$); 1-hexyl-3-ethylimidazolium ($C_{11}H_{21}N_2$), 1,3-dibutylimidazolium ($C_{11}H_{21}N_2$), 1-(4-methoxyphenyl)-3-methylimidazolium ($C_{11}H_{13}ON_2$); phenyl-3-methylimidazolium ($C_{12}H_{15}N_2$); 1-methyl-3-(3-methyl-benzyl)-imidazolium ($C_{12}H_{15}N_2$); 1-methyl-3-(2-methyl-benzyl)-imidazolium ($C_{12}H_{15}N_2$); 3-[2-(4-bromo-phenyl)-2-oxoethyl]-1-methyl imidazolium ($C_{12}H_{12}BrN_2O$); 1-octyl-3-methylimidazolium ($C_{12}H_{23}N_2$); phenylethanoyl-3-propylimidazolium ($C_{12}H_{15}N_2O$); heptoxymethyl-3-methylimidazolium ($C_{12}H_{23}N_2O$); 3-[2-(2-florophenyl)-2-oxoethyl]-1-methyl imidazolium ($C_{12}H_{12}FN_2O$); 11-(1-propoxymethyl)-3-(1-butoxymethyl)imidazolium ($C_{12}H_{23}N_2O_2$); 3-(4-Cyano-benzoyl)-1-methyl imidazolium ($C_{13}H_{12}N_3O$); 3-[2-(4-methyloxyphenyl)-2-oxoethyl]-1-methyl imidazolium ($C_{13}H_{15}N_2O_2$); 3-[2-(2-methyloxyphenyl)-2-oxoethyl]-1-methylimidazolium ($C_{13}H_{15}N_2O_2$); 1-ethyloxy-3-[2-(4-chlorophenyl)-2-oxoethyl]imidazolium ($C_{13}H_{14}ClN_2O_2$); 1-hydroxy-3-(3,4,5-trimethyloxybenzyl)imidazolium ($C_{13}H_{17}N_2O_4$); 1-ethyl-3-[2-(4-bromo-phenyl)-2-oxoethyl]imidazolium ($C_{13}H_{14}BrN_2O$); 1-methyl-3-[2,6-(S)-dimethylocten-2-yl] imidazolium ($C_{14}H_{25}N_2$); 1-octyl-3-propylimidazolium ($C_{14}H_{27}N_2$); 1-decyl-3-methylimidazolium ($C_{14}H_{27}N_2$);

3-[2-(1,2-dimethyloxyphenyl)-2-oxoethyl]-1-methylimidazolium ($C_{14}H_{17}N_2O$); 3-(1,1-dimethyl-2-phenyl-2-oxoethyl)-1-methylimidazolium ($C_{14}H_{17}N_2O$); 3-[2-(3,5-dimethoxylphenyl)-2-oxoethyl]-1-methylimidazolium ($C_{14}H_{17}N_2O_3$); 3-[2-(3,4-dimethyloxyphenyl)-2-oxoethyl]-1-methylimidazolium ($C_{14}H_{17}N_2O$); 1-(1-nonoxymethyl)-3-methylimidazolium ($C_{14}H_{27}N_2O$); 3-[2-(3-ethoxylphenyl)-2-oxoethyl]-1-methylimidazolium ($C_{14}H_{17}N_2O_2$); 3-[2-(4-ethoxylphenyl)-2-oxoethyl]-1-methylimidazolium ($C_{14}H_{17}N_2O_2$); 1-(1-amyloxymethyl)-3-butoxymethyl imidazolium ($C_{14}H_{17}N_2O_2$); 1-amyl-3-benzylimidazolium ($C_{15}H_{21}N_2$); 1-(1-hexyloxymethyl)-3-(1-butoxymethyl) imidazolium ($C_{15}H_{29}N_2O_2$); 1-undecyl-3-methylimidazolium ($C_{15}H_{29}N_2$); 1-(1-decyloxymethyl)-3-methylimidazolium ($C_{15}H_{29}N_2O$); 3-[2-(3-propyloxylphenyl)-2-oxoethyl]-1-methyl imidazolium ($C_{15}H_{19}N_2O_2$); 3-[2-(3-methyloxylphenyl)-2-oxoethyl]-1-isopropylimidazolium ($C_{15}H_{19}N_2O_2$); 3-[2-(2,4,6-trimethyloxyphenyl)-2-oxoethyl]-1-methylimidazolium ($C_{15}H_{19}N_2O_2$); 3-[2-α-naphthyl-2-oxoethyl]-1-methylimidazolium ($C_{16}H_{15}N_2O$); 1-(1-heptyloxymethyl)-3-(1-butoxymethyl) imidazolium) imidazolium ($C_{16}H_{31}N_2O_2$); 1-dodecyl-3-methylimidazolium ($C_{16}H_{31}N_2$); 1-(1-undecyloxymethyl)-3-methylimidazolium ($C_{16}H_{31}N_2O$); dimethylpropionyloxy)-3-[2-(4-chlorophenyl)-2-oxoethyl]imidazolium ($C_{16}H_{18}ClN_2O_3$); 1-(1-dodecyloxymethyl)-3-methylimidazolium ($C_{17}H_{33}N_2O$); 1-tridecyl-3-methylimidazolium ($C_{17}H_{33}N_2$); 1-benzyloxy-3-(2,4-dichlorobenzyl)imidazolium ($C_{17}H_{15}C_{12}N_2O$); 1-(4-benzoyl-benzyl)-3-methyl-imidazolium ($C_{18}H_{17}N_2O$); 1-tetradecyl-3-methylimidazolium ($C_{18}H_{35}N_2$); 3-[2-(3-methyloxylphenyl)-2-oxoethyl]-1-phenylimidazolium ($C_{18}H_{17}N_2O_2$); 1-(1-nonyloxymethyl)-3-(1-butoxymethyl) imidazolium ($C_{18}H_{35}N_2O_2$); 1-(2-phenylethyloxy)-3-(2,5-dichlorobenzyl)imidazolium ($C_{18}H_{17}C_{12}N_2O$); 1-[2,4-dichlorophenylmethyloxyl]-3-[2-(4-chlorophenyl)-2-oxoethyl]imidazolium ($C_{18}H_{14}C_{13}N_2O$); 1-pentadecyl-3-methylimidazolium ($C_{19}H_{37}N_2$); 1-phenyloxy-3-[2-(4-dimethylamino-phenyl)-2-oxoethyl]imidazolium ($C_{19}H_{20}N_3O_2$); 1-(1-decyloxymethyl)-3-(1-butoxy methyl) imidazolium ($C_{19}H_{37}N_2O_2$); 1-hexadecyl-3-methylimidazolium ($C_{20}H_{39}N_2$); 1-(1-decyloxymethyl)-3-hexyl imidazolium ($C_{20}H_{39}N_2O$); 1-(1-undecyloxymethyl)-3-(1-butoxy methyl)imidazolium ($C_{20}H_{39}N_2O$); 1-(1-undecyloxymethyl)-3-hexyl imidazolium ($C_{21}H_{41}N_2O$); 1-octadecyl-3-methylimidazolium ($C_{22}H_{43}N_2$); 1-cosyl-3-methylimidazolium ($C_{24}H_{47}N_2$); 1-(2-(2-(2-(2-(2-(2-(2-(methacryloyloxy)ethoxy)ethoxy)ethoxy)ethoxy)ethoxy)ethoxy)-3-ethylimidazolium ($C_{25}H_{45}O_9N_2$); polymer of PEOimidazolium; 3-dihydroxy-2-bromoimidazolium ($C_3H_4BrN_2O_2$); 1,3-dimethyl 5 chloroimidazolium ($C_5H_8ClN$); 2,4,5-trimethylimidazolium ($C_6H_{11}N_2$); 1,2,3-trimethylimidazolium ($C_6H_{11}N_2$); 1,3-dimethyl-nimtrimleimidazolium ($C_6H_8N_3S$); 1,2-dimethyl-3-ethylimidazolium ($C_7H_{13}N_2$); 1-ethyl-3,5-dimethylimidazolium ($C_7H_{13}N_2$); 1-ethyl-2,3-dimethylimidazolium ($C_7H_{13}N_2$); 1,3-dimethyl-4-methylimidazolium ($C_8H_{15}N_2$); 1,2-methyl-3-propylimidazolium ($C_8H_{15}N_2$); 1,2-ethyl-3-methylimidazolium ($C_8H_{15}N_2$); 1-propyl-2,3-dimethylimidazolium ($C_8H_{15}N_2$); 1-butyl-2,3-dimethylimidazolium ($C_9H_{17}N_2$); 3-butyl-1-,5-dimethylimidazolium ($C_9H_{17}N_2$); 1,3-dimethyl-2-phenylimidazolium ($C_{11}H_{13}N_2$); 1-benzyl-2-methyl-3-propyl ($C_{13}H_{19}N_2$), 1-octyl-2,3-dimethylimidazolium ($C_{13}H_{25}N_2$); 1,3-dipropyl-2-isobutylimidazolium ($C_{13}H_{25}N_2$); 1-methyl-3-(2-phenyl-2-oxoethyl)-5-methoxyimidazolium ($C_{13}H_{15}N_2O_2$); 1,2-dimethyl-3-phenylethanoyl (p-Cl) imidazolium ($C_{13}H_{14}ClN_2O$); 1-hydroxy-2-ethyl-3-[2-(4-chloro phenyl)-2-oxoethyl]imidazolium ($C_{13}H_{14}ClN_2O$); 1-benzyl-2-methyl-3-butylimidazolium ($C_{14}H_{21}N_2$); 1-benzyl-2-methyl-3-(3-methyl) propylimidazolium ($C_{14}H_{21}N_2$); 1-benzyl-2-methyl-3-amylimidazolium ($C_{15}H_{23}N_2$); 1-decyl-2,3-dimethylimidazolium; ($C_{15}H_{29}N_2$); 1-methyl-2-n-heptyl-3-benzyl imidazolium ($C_{18}H_{27}N_2$); 1-methyl-2-(2,2-dimethyl-1-methylene-propyl)-3-(2-phenyl-2-oxyethyl) imidazolium ($C_{18}H_{23}N_2O$); 1-(2,2-dimethyl propionyloxy)-2-ethyl-3-[2-(4-chlorophenyl)-2-oxoethyl]imidazolium ($C_{18}H_{22}ClN_2O_3$); 1,3-di-[4-nitrobenzyloxy]-2-methyl imidazolium ($C_{18}H_{17}N_4O_6$); 1,3-di-[4-bromobenzyloxy]-2-methyl imidazolium ($C_{18}H_{17}Br_2N_2O_2$); 1-phenyl-2-methyl-3-[2-(4-methoxy phenyl)-2-oxoethyl]imidazolium ($C_{19}H_{19}N_2O$); 1-benzyl-2-(2-phenyl-2-oxoethyl)-3-methylimidazolium ($C_{19}H_{19}N_2O$); 1,3-dibenzyl-4-(2-hydroxyethyl) imidazolium ($C_{19}H_{21}N_2O$); 1-benzyl-2-methyl-3-3-[2-(4-chloro phenyl)-2-oxoethyl]imidazolium ($C_{19}H_{18}ClN_2O$); 1-phenoxy-2-ethyl-3-[2-(4-chloro phenyl)-cf2-oxoethyl]imidazolium; ($C_{19}H_{18}ClN_2O_2$); 1,2-dimethyl-3-[2-(4-Nitro-benzoic acid)-benzyl]imidazolium ($C_{19}H_{18}N_3O_4$); 1,3-di-(2,6-dichlorobenzyloxy)-2-ethylimidazolium ($C_{19}H_{17}Cl_4N_2O_2$); 1,3-di-(2,4-dichlorobenzyloxy-)-2-ethylimidazolium ($C_{19}H_{17}Cl_4N_2O_2$); 1,3-di-[4-bromobenzyloxy]-2-ethyl imidazolium ($C_{19}H_{19}Br_2N_2O_2$); 1-methyl-2-n-nonyl-3-benzylimidazolium ($C_{20}H_{31}N_2$); 1-methyl-2-phenylvinyl-3-[2-phenyl-2-oxyethyl]imidazolium ($C_{20}H_{19}N_2O$); 1-phenylethanoyl-2-styrene-3-methylimidazolium ($C_{20}H_{20}N_2O$); 1-phenyl-2-methyl-3-[2-(4-chlorophenyl)-2-oxoethyl] imidazolium ($C_{20}H_{20}N_2O$); 1-benzyl-2-methyl-3-n-decylimidazolium ($C_{21}H_{23}N_2$); 1-(4-methyloxy-benzyl)-2-methyl-3-[2-(4-methoxylphenyl)-2-oxoethyl]imidazolium ($C_{21}H_{23}N_2O_2$); 1-benzyl-2-n-undecyl-3-methylimidazolium ($C_{22}H_{35}N_2$); 1-benzyloxy-2-ethyl-3-(3,4,5-trimethyloxybenzyl)imidazolium ($C_{22}H_{27}N_2O_4$); 1-benzyl-2-methyl-3-n-tetradecyl imidazolium ($C_{25}H_{41}N_2$); 1-benzyl-2-n-undecyl-3-amylimidazolium ($C_{26}H_{43}N_2$); 1,3-dihydroxy-2-methyl-4-bromo imidazolium ($C_4H_6BrN_2O_2$); 1,3-dihydroxy-2-phenyl-4-bromo imidazolium ($C_9H_6BrN_2O_2$); 1,3-diethyl-4,5-diphenylimidazolium ($C_{19}H_{21}N_2$); 1,3-dihydroxy-2-bromo-4,5-dimethylimidazolium ($C_5H_8BrN_2O_2$); 1,3-dimethyl-2,4,5-tri-bromo imidazolium ($C_5H_6Br_3N_2$); 1,2,3,4,5-methylimidazolium ($C_8H_{15}N_2$); α,ω-dimethyl bromide ($C_{10}H_{18}N_4Br_2$); α,ω-dipropyl bromide ($C_{11}H_{20}N_4Br_2$); α,ω-dibutyl bromide ($C_{12}H_{22}N_4Br_2$); α,ω-dihexyl bromide ($C_{14}H_{26}N_4Br_2$); α,ω-dimethylbis((trifluoromethyl)sulfonyl) imide ($C_{14}H_{18}F_{12}S_4O_8N_6$); α,ω-diimpropyl bis((trifluoro methyl)sulfonyl)imides ($C_{15}H_{20}F_{12}S_4O_8N_6$); α,ω-diimbutyl bis((trifluoro methyl)sulfonyl)imide ($C_{16}H_{22}F_{12}S_4O_8N_6$); 1-butyl-3-methylbenzotriazolium ($C_{11}H_{16}N_3$); 1-benzyl-3-methylbenzotriazolium ($C_{14}H_{14}N_3$); N,N-dimethylpyrrolidinium ($C_6H_{14}N$); N-methyl-N-ethyl-pyrrolidinium ($C_7H_{16}N$); N-methyl-N-propyl-pyrrolidinium ($C_8H_{18}N$); N-methyl-N-butyl-pyrrolidinium ($C_9H_{20}N$); N-methyl-N-hexyl-pyrrolidinium ($C_{11}H_{24}N$); N-methyl-N-propylpimperidinium ($C_9H_{20}N$); 1-ethyl-2-methylpyrrolimnimum ($C_7H_{14}N$); 1-propyl-2-methylpyrrolimnimum ($C_8H_{16}N$); 1-butyl-2-methylpyrrolimnimum ($C_9H_{18}N$); n-butyl pyridinium ($C_9H_{14}N$); 4-methyl-N-butylpyridinium ($C_{10}H_{16}N$); n-hexyl pyridinium ($C_{11}H_{18}N$); n-octyl pyridinium ($C_{13}H_{22}N$); n-decyl pyridinium ($C_{15}H_{26}N$) n-dodecyl pyridinium ($C_{17}H_{30}N$); 1-dodecyl-3-methylpyridinium ($C_{18}H_{32}N$); 1-dodecyl-4-methylpyridinium ($C_{18}H_{32}N$); n-tetradecyl pyridinium ($C_{19}H_{34}N$); 1-tetradecyl-3-methylpyridinium ($C_{20}H_{36}N$); 1-tetradecyl-4-methylpyridinium ($C_{20}H_{36}N$); n-hexadecyl pyridinium ($C_{21}H_{38}N$); 1-hexadecyl-3-methylpyridinium ($C_{22}H_{40}N$); 1-hexadecyl-4-methylpyridinium ($C_{22}H_{40}N$); n-octadecyl pyridinium ($C_{23}H_{42}N$);

1-octadecyl-3-methylpyridinium ($C_{24}H_{44}N$); 1-octadecyl-4-methylpyridinium ($C_{24}H_{44}N_2$); N-butyl-isoquinolinium ($C_{13}H_{16}N$); N-hexyl-isoquinolinium ($C_{15}H_{20}N$); N-octyl-isoquinolinium ($C_{17}H_{24}N$); N-decyl-isoquinolinium ($C_{19}H_{28}N$); N-dodecyl-isoquinolinium ($C_{21}H_{32}N$); N-tetradecyl-isoquinolinium ($C_{23}H_{36}N$); N-hexadecyl-isoquinolinium ($C_{25}H_{40}N$); N-octadecyl-isoquinolinium ($C_{27}H_{44}N$); 4-ethyl-2-isopropyl-3-butyl-4,5-dihydro-thiazolium ($C_{12}H_{24}NS$); 4-ethyl-2-isopropyl-3-dodecyl-4,5-dihydro-thiazolium ($C_{20}H_{40}NS$); tri-methylsulfonium ($C_3H_9S$); tri-ethylsulfonium ($C_6H_{16}S$); tetra-methylsulfonium ($C_8H_{20}S$); tri-butylsulfonium ($C_{12}H_{27}S$); tetrammoniumethylammonium ($C_4H_{12}N$); trimethyl-ethynyl ammonium ($C_5H_{10}N$); trimethylethylammonium ($C_5H_{14}N$); trimethyl-methoxymethylammonium ($C_5H_{14}NO$); trimethyl-propargyl ammonium ($C_6H_{12}N$); trimethyl-allylammonium ($C_6H_{14}N$); trimethylpropylammonium ($C_6H_{16}N$); trimethyl-isopropylammonium ($C_6H_{16}N$); dimethyl-diethylammonium ($C_6H_{16}N$); dimethylethylmethoxymethyleneammonium ($C_6H_{16}NO$); methoxymethylenedimethylethylammonium ($C_6H_{16}NO$); dimethyl-ethyl-propylammonium ($C_7H_{18}N$); trimethyl-butylammonium ($C_7H_{18}N$); triethyl-methylammonium ($C_7H_{18}N$); ethoxymethylene-dimethyl-ethyl ammonium ($C_7H_{18}NO$); methoxyethyl-dimethyl-ethylammonium ($C_7H_{18}NO$); tetraethylammonium ($C_8H_{20}N$); dimethyl-ethyl-butylammonium ($C_8H_{20}N$); ethoxyethyl-dimethyl-ethylammonium ($C_8H_{20}NO$); dimethyl-propyl-butylammonium ($C_9H_{22}N$); trimethyl-hexylammonium ($C_9H_{22}N$); methyl-ethyl-dipropylammonium ($C_9H_{22}N$); diethyl-di(iso)propylammonium ($C_{10}H_{24}N$); trimethyl-heptylammonium ($C_{10}H_{24}N$); trimethyl-octylammonium ($C_{11}H_{26}N$); triethyl-(2-methylbutyl)ammonium ($C_{11}H_{26}N$); tetrapropylammonium ($C_{12}H_{28}N$); triethyl-hexylammonium ($C_{12}H_{28}N$) tri-ethyl-heptylammonium ($C_{13}H_{30}N$); triethyl-octylammonium ($C_{14}H_{32}N$); di(iso)propylethylheptylammonium ($C_{15}H_{34}N$); tetrabutylammonium ($C_{16}H_{36}N$); tributyl-hexylammonium ($C_{18}H_{40}N$); tributyl-heptylammonium ($C_{19}H_{42}N$); tributyl-octyl ammonium ($C_{20}H_{44}N$); tetramyl ammonium ($C_{20}H_{44}N$); tetrahexyl ammonium ($C_{24}H_{52}N$); trioctyl-propyl ammonium ($C_{27}H_{58}N$); tetraheptyl ammonium ($C_{28}H_{60}N$); triyl-tetradecyl ammonium ($C_{29}H_{62}N$); tetraoctyl ammonium ($C_{32}H_{68}N$); trihexyl-tetradecyl ammonium ($C_{32}H_{68}N$); tridodecyl-methyl ammonium ($C_{37}H_{78}N$); tetradecyl ammonium ($C_{40}H_{84}N$); [bis(butyl-methyl-amino)-methylene] dimethylammonium ($C_{13}H_{30}N_3$); [bis(butyl-ethyl-amino)-methylene] dimethyl-ammonium ($C_{15}H_{34}N_3$); [bis(bis-butyl-amino)-methylene] dimethyl-ammonium ($C_{19}H_{42}N_3$); [bis(bis-hexyl-amino)-methylene] dimethyl-ammonium ($C_{23}H_{50}N_3$); [bis(bis-octyl-amino)-methylene] dimethyl-ammonium ($C_{27}H_{58}N_3$); tetraethylphosphonium ($C_4H_{12}P$); tetraethylphosphoniumimethylene-1,4,10,13-tetrakisazacycloheptadecane ($C_8H_{20}P$); tridecylmethylphosphonium ($C_{31}H_{66}P$); trihexyl-tetradecylphosphonium ($C_{32}H_{68}P$); tetra-methyl arsenic ($C_4H_{12}As$); 1,1,6,6-tetramethyl-3-yn-1,6-diazecanediaminium ($C_{12}H_{24}N_2$); (z)-1,1,6,6-tetramethyl-3-en-1,6-diazecanediaminium ($C_{12}H_{26}N_2$); 1,1,6,6-tetramethyl-1,6-diazecanediaminium ($C_{12}H_{28}N_2$); N-(2-(((3-hydroxypropyl)dimethylammonio)methyl)benzyl)-3-hydroxy-N,N-dimethylpropyl-1-aminium ($C_{18}H_{34}O_2$); (1,4),(1,4),(9,12),(9,12)-tetradimethylene-6-en-1,4,9,12-tetrakisazacyclohexadecane tetraminium ($C_{20}H_{38}N_4$); 6,8-(1',3'-phenylene)-(1,4),(1,4),(10,13),(10,13)-tetradimethylene-1,4,10,13-tetrakisazacycloheptadecanetetraminium ($C_{24}H_{36}N_4$); 6,8-(1',3'-phenylene)-(1,4),(1,4),(10,13),(10,13)-tetradimethylene-1,4,10,13-tetrakisazacyclotricosanetetraminium ($C_{30}H_{52}N_4$); tetraphenylphosphonium bis(trifluoromethanesulfonyl)imide and tetraphenylphosphonium bromide, lithium bis(trifluoromethanesulfonyl)imide; tetrabutylphosphonium methane sulfonate; tetrabutylphosphonium tetrafluoroborate; tetrabutylphosphonium p-toluenesulfonate; trihexyltetradecylphosphonium bis(trifluoromethylsulfonyl)amide; trihexyltetradecylphosphonium bis(2,4,4-trimethylpentyl) phosphinate; trihexyltetradecylphosphonium bromide; trihexyltetradecylphosphonium chloride; trihexyltetradecylphosphonium decanoate; trihexyltetradecylphosphonium dicyanamide; 3-(Triphenylphosphonio)propane-1-sulfonate; and 3-(triphenylphosphonio)propane-1-sulfonic acid tosylate.

8. The method of claim 1 wherein the ionic salt is one or more of 3-(Triphenylphosphonio)propane-1-sulfonate, and 3-(Triphenylphosphonio)propane-1-sulfonic acid tosylate.

9. The method of claim 1 wherein the protective compound reacts with water or oxygen to form an oxidized compound.

10. The method of claim 1 wherein the protective compound is an organic compound, a phosphorous compound, a sulfur compound, or any combination thereof.

11. The method of claim 10 wherein the protective compounds is an organic compound that is selected from one or more of triphenylphosphine, trialkylphoshine wherein the alkyl group has at least four carbon atoms, triphenylmethane, 4-(dimethylamino)phenyldiphenylphosphine, triphenylamine, N-methylimidiazone, diphenyl amine, oleyl amine, and diphenyl sulfide.

12. The method of claim 1 wherein the ionic salt is present in the depolymerization composition in an amount ranging from about 1 to about 99 wt % and the protective compound is present in the depolymerization composition in an amount ranging from about 1 to about 99 wt %.

13. The method of claim 1 wherein the depolymerization composition includes from about 1 to about 50 wt % ionic salt and from about 50 to about 99 wt % of the protective compound.

14. The method of claim 1 wherein the depolymerization composition includes from about 1 to about 10 wt % ionic salt and from about 90 to about 99 wt % of the protective compound.

15. The method of claim 1, wherein following heating the recycle admixture for the period of time at the processing temperature, free fiber is separated from the recycle admixture leaving a partially spent recycle liquid including ionic salt, organic compound and decomposed polymer.

16. The method of claim 15 wherein the separated free fiber is washed with a solvent.

17. The method of claim 15 wherein following separating the free fiber from the recycle admixture, the partially spent recycle liquid is combined with a wash solvent to remove the decomposed polymer to form a purified recycle admixture.

18. The method of claim 17 wherein the wash solvent is one or more of acetone, tetrahydrofuran, ethyl acetate, toluene, methanol, ethanol, propanol, isopropyl alcohol, n-butanol, t-butanol, methyl-t-butyl ether, and compatible mixtures thereof.

19. The method of claim 15 wherein the recycle admixture includes purified recycle admixture.

20. The method of claim 1, wherein the processing temperature ranges from about 150° C. to about 400° C.

21. The method of claim 1 wherein the processing temperature ranges from about 300° C. to about 400° C.

22. The method of claim 1 wherein the period of time sufficient to at least partially depolymerize a portion of the fiber reinforced polymer to yield free fiber and decomposed polymer is from about 5 minutes to about 120 minutes.

23. The method of claim 1 wherein the recycle admixture is maintained at the processing temperature under an oxygen free atmosphere.

24. The method of claim 1 wherein the fiber reinforced polymer is a carbon fiber reinforced polymer.

* * * * *